June 12, 1951     J. G. OETZEL     2,556,976
RETURN SPRING
Filed April 1, 1947

INVENTOR
John George Oetzel
By Carlson, Pitzner, Hubbard & Wolfe
ATTORNEYS

Patented June 12, 1951

2,556,976

UNITED STATES PATENT OFFICE 2,556,976

RETURN SPRING

John George Oetzel, Beloit, Wis., assignor to Warner Electric Brake & Clutch Company, a corporation of Illinois Application April 1, 1947, Serial No. 738,629

5 Claims. (Cl. 267—1)

This invention relates to a contractile spring for returning two parts to a normal centered position after relative movement between the parts in either direction away from such position.

One object is to anchor opposite ends of the spring on abutments which are arranged in pairs in a novel manner to center the applied forces relative to the spring axis, to provide optimum compactness, and to enable the abutments to be formed by a minimum number of sheet metal parts.

A more detailed object is to dispose the abutments of each pair on opposite sides of the return spring with the abutments of each pair constituting the legs of U-shaped members.

The invention also resides in the novel shaping of the abutment surfaces and the coacting surfaces of the spring anchors.

Other objects and advantages of the invention will become apparent from the following detailed description taken in connection with the accompanying drawings, in which.

Figure 1:
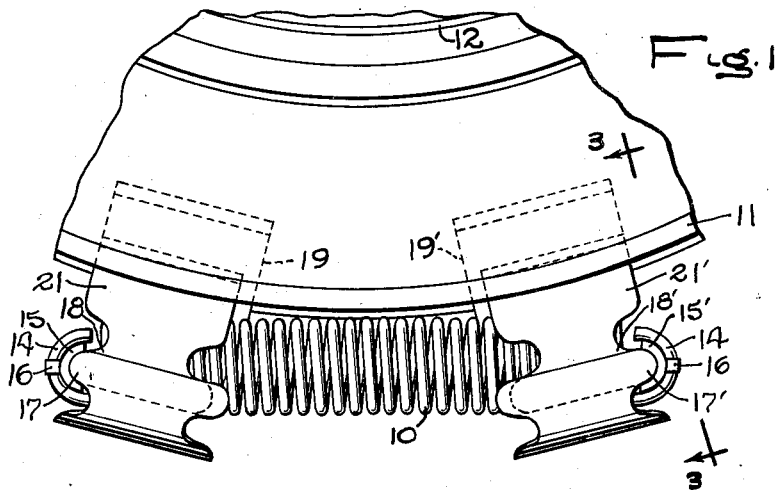
Figure 1 is a fragmentary side view of a return spring and its mounting embodying the features of the present invention.

For purposes of illustration, the invention is shown in the drawings as a means for mounting a contractile spring 10 which is used to hold an angularly movable part 11 in a normally centered position (Fig. 1) while permitting angular movement of the part in either direction away from such position. Herein the part 11 is ring-shaped and journaled on a bearing 12 supported by a nonrotatable part 13.

The spring comprises a helical coil of wire formed at opposite ends with hooks 14 which herein extend around crosspieces 15 and 15′ on which the spring ends are centered by outwardly projecting lugs 16. The crosspiece 15 extends across and is contoured in cross-section to interfit with abutments 17 and 18 respectively carried by the stationary and movable parts 13 and 11.

Figure 2:
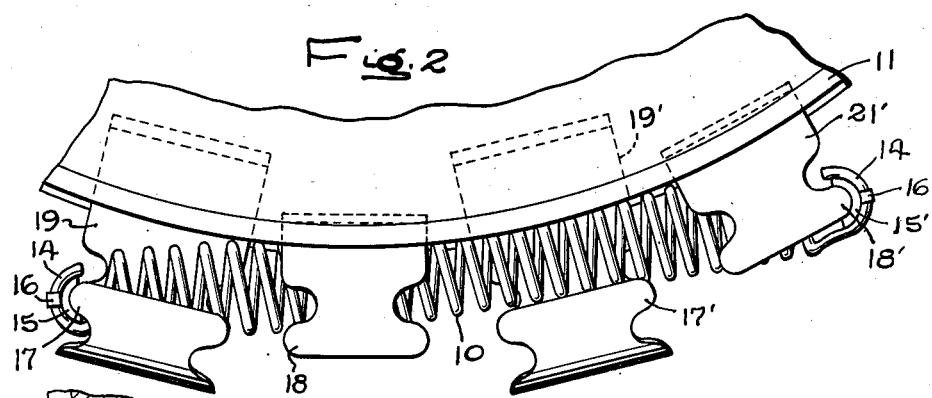
Fig. 2 is a similar view with the parts in a moved position.
Figure 3:
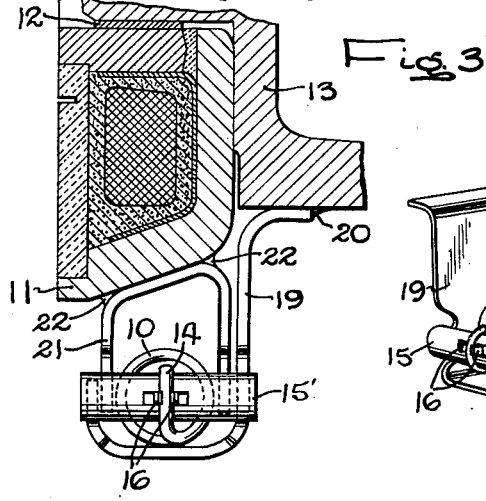
Fig. 3 is a fragmentary sectional view taken along the line 3—3 of Fig. 1.
Figure 4:
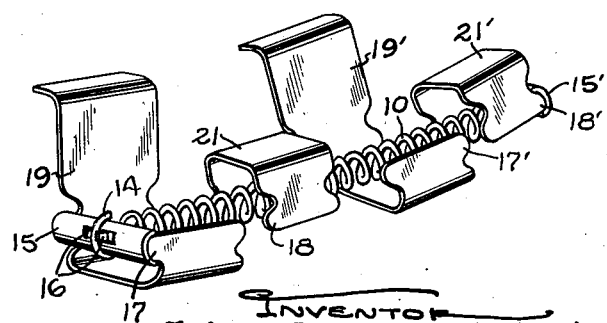
Fig. 4 is a perspective view of the spring and its mounting.

There are two movable abutments 17 spaced apart along the axis of the movable part and registering angularly so that when the crosspiece 15 is engaging both of these abutments as shown in Figs. 2 and 4, it lies parallel to the axis of the movable part. Herein, the abutments 17 are shaped from the parallel legs of a U-shaped sheet metal member 19 one leg of which is made longer than the other and bent at its end so as to facilitate spot welding at 20 to the stationary part 13.

The abutments 18 face circumferentially in the same direction as the abutments 17 and are shaped out of the edges of the legs of a U-shaped sheet metal member 21 spot welded at 22 to the outer periphery of the ring 11. These abutments also register angularly and are spaced closer together than the abutments 17 so as to pass between the latter as the ring 11 is moved back and forth. Both pairs of abutments 17 and 18 are disposed equidistant from the ring axis so that when the ring is normally centered as shown in Fig. 1, the crosspiece 15 will interlock with all four abutments. Such mating engagement is obtained herein by making one of the coacting surfaces, in this instance the abutments, of convex curvature and the other or crosspiece surface of complemental concave curvature.

The other crosspiece 15′ cooperates in the same way with four similarly shaped abutments arranged in pairs 17′ and 18′ and formed on similar sheet metal members 19′ and 21′ respectively welded to the parts 13 and 11 but angularly spaced from the members 19 and 21. This spacing is such that in the normally centered position of the ring 11 (Fig. 1), the spring 10 is stretched sufficiently to provide the desired initial tension for holding the ring yieldably against angular movement in either direction.

To enable the abutments to be formed close to the end of the legs of the U-shaped members 19, 19′, 21, and 21′ and the over-all radial dimension of the unit to be reduced to a minimum, the abutments are convexly curved and the surfaces of the crosspieces 15 and 15′ interfitting with the abutments are made of complemental concave curvature.

In the normal centered position of the ring 11 (Fig. 1), the abutments 17 and 18 register angularly and all four of them thus engage and seat in the concave side of the crosspiece 15. The four abutments 17′ and 18′ similarly engage the crosspiece 15′. As a result, the ring is held against angular movement in either direction with a force determined by the tension of the spring 10. Now, if the ring with the members 21 attached thereto is moved counterclockwise as shown in Fig. 2 out of centered position, the crosspiece 15′ is carried away from the fixed abutments 17′ by the movable abutments 18′, the crosspiece 15 remaining anchored on the abutments 17 as the abutments 18 move away from this crosspiece. The spring is thus extended thereby increasing the force tending to return the parts to centered position. When the ring 11 is again allowed to return under the action of the spring 10, the abutments 18 again come against the crosspiece 15 and the crosspiece 15′ again engages the abutments 17′ as the centered position of the parts is restored.

Similar action takes place when the ring 11 is moved in the opposite direction, that is, clockwise as viewed in Fig. 1. In this case, the crosspiece 15' remains anchored on the abutments 17' and the spring is extended from its other end by movement of the crosspiece 15 with the abutments 18 away from the abutments 17. The two sets of four abutments again come into contact (Fig. 1) as the ring is allowed to return to the centered position.

It will be apparent from the foregoing that the crosspieces 15 and 15' always remain radially spaced equidistant from the axis of the ring 11 irrespective of the angular position of the latter. There is no rubbing action to wear out the spring ends or any of the parts and the restoring forces applied by the single spring are uniform and proportional in magnitude to the extent of movement of the ring away from the centered position in which the ring is held firmly by the initial spring tension. The parts 19' and 21' are duplicates of the parts 19 and 21, and all four are simple sheet metal stampings. By arranging the spring between each pair 17, 18, 17' or 18' of the abutments and by spacing the abutments 17 and 17' to straddle the abutments 18 and 18', optimum axial compactness of the unit is achieved and at the same time all of the forces are balanced relative to the center line of the spring. Radial compactness is promoted by opening the U-shaped members 19 and 21 in opposite directions relative to each other and by supporting the members 19 and 19' from the longer legs thereof.

I claim as my invention:

1. The combination with two parts relatively movable along a predetermined path of, a longitudinally extensible and contractible coiled spring extending along said path, a pair of U-shaped members fixed to one of said parts and spaced along said spring with legs of the members straddling the spring and the open end of the U's facing in one direction, a second pair of U-shaped members fixed to the other of said parts and similarly spaced along said spring and straddling the spring and said first pair with said second pair opening in the opposite direction, the legs on one of said first members and the corresponding one of said second members providing pairs of abutments facing along said path in one direction and the legs of the other two members providing pairs of abutments facing in the opposite direction, and crosspieces respectively engageable with said first and second pairs of abutments, said spring being stretched between said crosspieces and acting to return said parts, after relative displacement along said path in either direction, to a center position in which all of said abutments are in engagement with said crosspieces.

2. The combination with two parts relatively movable along a predetermined path of, a pair of U-shaped members opening toward each other transversely of said path with the open end of one member straddling the other member and having legs providing abutments facing along said path in one direction, one of said members being fixed to each of said parts, a second pair of U-shaped members similarly arranged with abutments facing along said path in the opposite direction and spaced along said path from said first abutments, an element adapted for abutting engagement with said first abutments, a second element adapted for abutting engagement with said second abutments, and a coiled contractile spring lying along said path within all of said members and stretched between said elements, said abutments having convex surfaces interfitting with complemental concave surfaces on said elements.

3. The combination with two parts mounted for relative movement along a predetermined path of, a pair of U-shaped members opening toward each other and having legs providing abutments facing along said path in one direction, one of said members being fixed to each of said parts, a second pair of U-shaped members similarly arranged with abutments facing in the opposite direction and spaced along said path from said first pair, each of said four members comprising a strip of sheet metal with opposite end portions bent into laterally spaced parallel relation, said abutments of each pair of members being adapted to move past each other in a common path, an element engageable with said abutments facing in one direction, a second element engageable with said oppositely facing abutments, and a longitudinally extensible and contractible resilient means stretched between said elements and lying along said path within all of said abutments.

4. The combination with two parts relatively movable along a predetermined path of, a longitudinally extensible and contractible coiled spring extending along said path, a pair of U-shaped members fixed to one of said parts and spaced along said spring with legs of the members straddling the spring, a second pair of U-shaped members fixed to the other of said parts and similarly spaced along the spring and straddling the spring and said first pair, the legs on one of said first members and the corresponding one of said second members providing pairs of abutments facing along said path in one direction and the legs of the other two members providing pairs of abutments facing in the opposite direction, and crosspieces attached to opposite ends of said spring and respectively engageable with said first and second pairs of abutments.

5. The combination with two parts mounted for relative movement along a predetermined path of, a longitudinally extensible and contractible coiled spring extending along said path, two pairs of laterally spaced abutments fixed to one of said parts and spaced along said spring with the abutments of each pair disposed on opposite sides of said spring, two other pairs of laterally spaced abutments fixed to the other of said parts for movement past said first mentioned pairs and correspondingly spaced along said spring with the abutments of each pair disposed on opposite sides of said spring, the abutments of one of said first mentioned pairs and of the corresponding one of said other pairs facing along said path in one direction and said abutments of the other two pairs facing in the opposite direction, and crosspieces attached to opposite ends of said spring and respectively engageable with said abutments facing in one direction and said oppositely facing abutments.

JOHN GEORGE OETZEL.

REFERENCES CITED

The following references are of record in the file of this patent:

UNITED STATES PATENTS

| Number | Name | Date |
|---|---|---|
| 1,258,631 | Elers | Mar. 5, 1918 |
| 1,279,999 | Eaton | Sept. 24, 1918 |

FOREIGN PATENTS

| Number | Country | Date |
|---|---|---|
| 352,270 | Germany | Apr. 22, 1922 |